3,772,373
PREPARATION OF HIGH MOLECULAR WEIGHT ALKYLBENZENE SULFONYL CHLORIDES
Richard J. Lee, Park Forest, Ill., assignor to Standard Oil Company, Chicago, Ill.
No Drawing. Filed Oct. 30, 1969, Ser. No. 872,736
Int. Cl. C07c 143/70
U.S. Cl. 260—543 R    3 Claims

ABSTRACT OF THE DISCLOSURE

Alkylbenzene sulfonyl chloride:

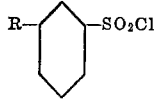

wherein R is an alkyl group, can be prepared by a chlorosulfonation of alkylbenzene hydrocarbons without formation of sulfuric acid and without chlorination of alkylbenzene sulfonic acid. Said method is carried out by reacting alkylbenzene with 1.0:1.0 molar mixture of chlorosulfonic acid ($ClSO_3H$) and sulfurylchloride ($SO_2Cl_2$).

BACKGROUND OF THE INVENTION

It is known to prepare benzene and alkylbenzene sulfonyl chlorides by reacting benzene or its alkylated derivative with sulfuric acid (85% $H_2SO_4$ up to oleum of 20% $SO_3$) to first form the corresponding benzene sulfonic acid and after removal of residual sulfuric acid, react the benezene sulfonic acid which chlorine gas. It is also known from the preparation of such benzene sulfonyl chlorides to react benzene or its alkylated derivative with chlorosulfonic acid ($ClSO_3H$). The latter method produces HCl and $H_2SO_4$ as by-products. The removal of HCl and $H_2SO_4$ do not present a serious problem when the alkylbenzene sulfonyl chloride has an alkyl group of from 1 to about 20 carbon atoms. However, when the alkyl group has upward from 30 carbon atoms, for example 30 to 200 carbon atoms, the alkylbenzene sulfonyl chloride even when diluted with a middle range alkane is a rather viscous product and $H_2SO_4$ removal therefrom is quite difficult and is not at all satisfactory or complete.

I have discovered a method of sulfochlorination of alkylbenzenes hydrocarbons wherein the alkyl group contains upward from 30 carbon atoms, that avoids the foregoing drawbacks.

SUMMARY OF THE INVENTION

Alkylbenzene hydrocarbons are converted to sulfonyl chlorides by reaction with a 1.0:1.0 molar mixture of chlorosulfonic acid ($ClSO_3H$) and sulfuryl chloride ($SO_2Cl_2$) producing $SO_3$ and HCl as by-products and without co-production of sulfuric acid. This preparative method is especially useful for the preparation of alkylbenzene sulfonyl chlorides from alkylbenzene hydrocarbons wherein the alkyl-substitutent has upward from 30 carbon atoms. Alkylbenzene hydrocarbons wherein the alkyl-substituent has 30 to 200 carbon atoms and their sulfonyl chloride derivatives are viscous liquids from which liquid sulfuric acid, dilute or concentrated form or acid sludge are quite difficult to separate.

For many purposes the retention of small amounts of those liquid co-products is undesirable. Alkylbenzene sulfonyl chlorides are useful reactants, for example in the preparation of alkylbenzene sulfonamide detergents. Such sulfonamides are useful when the presence of small amounts of sulfates would function as undesirable corrosion agents. In other cases where the alkylbenzene sulfonyl chlorides are used as reactants, the presence of small amounts of sulfuric acid co-product would have an adverse effect on the desired direction of the reaction or unduly complicate recovery of the desired product.

The preparative method of this invention can be carried out at convenient temperatures and pressures. In general, this chlorosulfonation is conducted at ambient pressure but sub- or superatmospheric pressure can be used if desired. The chlorosulfonation method of this invention can be conducted at temperatures suitably from ambient, about 75° F., up to 100° F. Higher temperatures can be used but no apparent advantage is obtainable when so doing because at temperatures between 75 and 100° F. the chlorosulfonation is suitably fast for commercial use. The viscosity of the reaction mixture can be used to advantage to reduce by the use of a middle range alkane as reaction diluent. Middle range alkanes are those having 6 to 10 carbon atoms, i.e. hexanes to decanes including normal as well as branched chain $C_6$–$C_{10}$ alkane hydrocarbons. Also the use of said middle range alkanes permits upon their removal by distillation a more complete removal of $SO_3$ and HCl by-product gases which can be purged as gases when condensing the alkane for recovery and reuse.

Also, after heat evolution of the sulfochlorination substantially subsides, the reaction mixture can be heated to the alkane reflex temperature for a period of time, one to two hours is suitable, not only to complete the sulfochlorination but also to drive off substantial quantities of HCl and $SO_3$ by-products. Thereafter the alkane diluent is removed by distillation which can be aided and increased by injecting an inert gas, preferably nitrogen gas, into the liquid as it becomes more viscous during alkane removal.

Suitable alkylbenzene hydrocarbon to be sulfochlorinated can be any alkylbenzene hydrocarbon having at least one alkyl group of 30–200 carbon atom content i.e., of molecular weight of 420–2800. Preferred are the mono-alkylbenzene hydrocarbons wherein the alkyl-substituent has 30 to 200 carbon atoms and of these the polypropyl- and polybutyl-substituted benzenes whose polypropyl and polybutyl groups have a molecular weight in the range of 420–2800 are most preferred. Such mono-polypropyl- and mono-polybutyl-substituted benzenes obtained by the alkylation of benzene with polymers of propylene or butenes according to known methods. The polypropylenes and polybutylenes are liquid viscous products of polymerizing propylene or butenes for example in the presence of aluminum chloride. Such polybutenes are obtained from the polymerization of such butenes as isobutylene, butene-1 and butene-2 mixtures thereof. The liquid viscous polybutenes from such polymerization of mixtures of butene and the butenes are suitable for the alkylation of benzene by known techniques. The polybutenes and polypropylenes are obtained as mixtures or fractions of mixtures of polymers and such products or fractions thereof are characterized by their number average molecular weight ($\overline{M}n$). Hence the mono-polybutyl and mono-polypropylbenzenes derived therefrom are not single compounds but rather are mixtures of alkylated benzenes properly characterized by their number average molecular weight ($\overline{M}n$). For example the mono-polypropylbenzene having a 500 $\overline{M}n$ will have a polypropyl substituent of 423 $\overline{M}n$ or number average carbon content of about 30. But such a 500 $\overline{M}n$ mono-propylbenzene will be a mixture of polypropylbenzenes whose components have less than 30 carbons and more than 30 carbons in the polypropyl group. Also some of the mono-alkylbenzenes having an alkyl group upward from 30 carbon atoms can be obtained by the alkylation of benzene with the corresponding $C_{30+}$ alcohol derived from the reduction of normally occurring acids in wax esters.

The following examples will illustrate the preparative method of this invention.

Example 1

A solution is prepared in a reactor having a water cooled reflux condenser by combining and stirring 1000 milliliters of n-hexane and 498 grams (1.0 mole) mono-n-triacontyl benzene at ambient temperature, about 77° F. To this stirred solution is added a mixture of one mole each of chlorosulfonic acid and sulfuryl chloride with external cooling to maintain a temperature of 85–90° F. After said 1.0:1.0 molar mixture has been added the temperature of the stirred mixture is increased to and held at n-hexane reflux temperature for about two hours. Thereafter cooling of the reflux condenser is stopped and the stirred mixture is heated to and maintained at 250° F. and nitrogen gas is injected into the stirred liquid until all the hexane has been distilled off. The hexane vapors are collected and condensed and the uncondensed gas is passed through an aqueous sodium carbonate solution to scrub out HCl and $SO_3$ gases before venting.

In this manner n-triacontylbenzene sulfonyl chloride is obtained as the hexane free residue.

Example 2

To a reaction vessel such as used in Example 1, there is added and stirred 500 milliliters of $C_7$ alkanes 877 grams of mono-polypropylbenzene of 877 $\overline{M}n$. To the resulting stirred solution at 75° F. is added slowly a mixture of one mole each of chlorosulfonic acid and sulfuryl chloride so that the temperature of the stirred mixture does not exceed 90° F. After said slow addition of the mixture, the stirred liquid is heated to and maintained at the reflux temperature of the $C_7$ alkanes for about one hour and thereafter the $C_7$ alkanes are distilled off with nitrogen gas injection into the residual liquid.

In this manner mono-polypropyl sulfonyl chloride (polypropyl of 800 $\overline{M}n$) is obtained as the $C_7$ alkane free residue.

Example 3

The method of Example 2 is repeated except that 891 grams of mono-polypropyltoluene (polypropyl group of 800 $\overline{M}n$) is sulfochlorinated and mixed pentanes are used as the reaction diluent.

In this manner a mixed mono-polypropyltoluene sulfonyl chloride product (polypropyl of $\overline{M}n$) free of pentanes is obtained as the residue.

Example 4

The method of Example 2 is repeated except that 1500 milliliters of n-hexane are used as reaction diluent and 1326.5 grams (0.5 mole) of 2653 $\overline{M}n$ mono-polybutylphenol is used to form the starting solution and only 0.5 mole each of $ClSO_3H$ and $SO_2Cl_2$ are used for the chlorosulfonation.

In this manner mono-polybutylenezene sulfonylchloride (polybutyl group of 2576 $\overline{M}n$) is obtained as a hexane free residue.

Example 5

The method of Example 2 is repeated using 1500 milliliters of n-hexanes, 725 grams (0.25 mole) of mono-(polybutyl group of 2813 $\overline{M}n$) is obtained as the hexane each of $ClSO_3H$ and $SO_2Cl_2$.

In this manner non-polybutylbenzene sulfonyl chloride (polybutyl group of 2813 $\overline{M}n$) is obtained as the hexane free residue.

Example 6

The method of Example 2 is repeated using 1000 milliliters of n-hexane, 729 grams (1.0 mole) mono-polypropylbenzene (polypropyl group of 652 $\overline{M}n$) and 1.0 mole each of $ClSO_3H$ and $SO_2Cl_2$.

In this manner there is obtained mono-polypropylbenzene sulfonyl chloride (polypropyl group or 652 $\overline{M}n$) as hexane free residue.

The invention claimed is:

1. A method of preparing alkylbenzene sulfonyl chloride wherein there is one alkyl group of 30 to 200 carbon atoms which comprises reacting at a temperature in the range of 75–100° F. equimolecular proportions of each of an alkylbenzene having one alkyl group of 30 to 200 carbon atoms, sulfuryl chloride and chlorosulfonic acid in the presence of an alkane hydrocarbon diluent having 6–10 carbon atoms and distilling said alkane from the resulting reaction mixture.

2. The method of claim 1 wherein the alkylbenzene is mono-polypropylbenzene having a polypropyl group of from about 420 to about 2800 $\overline{M}n$.

3. The method of claim 1 wherein the alkylbenzene is a mono-polybutylbenzene having a polybutyl group of from about 420 to about 2800 $\overline{M}n$.

References Cited

UNITED STATES PATENTS

| | | | |
|---|---|---|---|
| 3,686,300 | 8/1972 | Oton et al. | 260—543 |
| 3,364,258 | 1/1968 | DeJong | 260—543 |

OTHER REFERENCES

Houben-Weyl., Methoden der Org. Chemie, Band IX, p. 572.

Houben-Weyl., Methoden der Org. Chemie, Band IX, p. 578.

Houben-Weyl., Methoden der Org. Chemie, Band IX, p. 576.

LORRAINE A. WEINBERGER, Primary Examiner

R. GERSTL, Assistant Examiner